United States Patent

Macoustra

[15] 3,644,236
[45] Feb. 22, 1972

[54] LEAD FILLED POLYURETHANE FOAMS

[72] Inventor: James Macoustra, Sutton, Surrey, England

[73] Assignee: BP Chemicals (U.K.) Limited, London, England

[22] Filed: Feb. 20, 1969

[21] Appl. No.: 801,159

[30] Foreign Application Priority Data

Feb. 21, 1968 Great Britain..........................8,377/68

[52] U.S. Cl...................................260/2.5, 161/190, 181/33
[51] Int. Cl. ..................C08g 22/44, B32b 27/20, E04b 1/74
[58] Field of Search..............................................260/2.5 AK

[56] References Cited

FOREIGN PATENTS OR APPLICATIONS 693,200  8/1964  Canada....................................260/2.5
876,469  9/1961  Great Britain..........................260/2.5

Primary Examiner—Donald E. Czaja
Assistant Examiner—H. S. Cockeram
Attorney—Jacobs and Jacobs

[57] ABSTRACT

Lead filled polyurethane foams having a Young's Modulus value above 30,000.

5 Claims, No Drawings

LEAD FILLED POLYURETHANE FOAMS

This invention relates to plastics foams having new and improved properties, to a method of making such foams and to articles made therefrom. More particularly the invention relates to polyurethane foams containing a powdered elemental lead filler.

Lead filled plastics are known and it is stated that these products act as radiation shields and as sound deadening shields.

An object of the present invention is to provide a polyurethane foam filled with powdered lead having outstanding acoustic properties.

Accordingly the present invention is a rigid polyurethane foam filled with powdered lead having a Young's Modulus greater than 30,000 pounds per square inch. A particularly preferred range of foam has a Young's Modulus in the range 40,000 to 150,000 pounds per square inch and a still more preferred range of foams has a Young's Modulus in the range 50,000 to 140,000 pounds per square inch.

Foams filled with powdered lead at lead concentrations lower than about 80 percent weight lead concentration, have Young's Modulus values in the region of 10,000 to 20,000 pounds per square inch and it could have been expected that lead concentrations of greater than 80 percent weight would not have produced very much greater Young's Modulus values. Surprisingly it is found that when the lead concentration is increased to above about 80 percent, preferably above 85 percent, by weight the Young's Modulus increases very rapidly to an unexpected extent. At 90 percent lead concentration for example, the Young's Modulus is six to seven times the value at 80 percent concentration. Foams having a lead concentration in the range 85 to 95 percent by weight are useful and those having a concentration in the range 87 to 92.5 percent are particularly useful.

The term 'rigid polyurethane foam' is used in its normal sense to cover a foam which shows a definite yield point on compression. If compressed beyond its yield point the rigid foam will fail to recover its original size and shape.

The powdered lead should be finely divided and preferably passes a British Standard Sieve Size 100. Good foams are obtained with powdered lead the majority (i.e., at least 50 percent of which passes a B.S. Sieve Size 200.

Polyurethane resins are well known and are made by reacting polyisocyanates with polyols. The rigid polyurethane foams of the present invention may be polyether-based or polyester based and may be made by any of the techniques known in the art. The principal techniques may be summarized as follows:

One Shot Process

In this case the polyisocyanate and the polyol are reacted together directly to produce the finished polymer. In each case it is to be understood that the formulation will contain auxiliary materials such as catalysts, foam stabilisers, and blowing agents. The system may or may not contain added water.

Semiprepolymer Process

This process is often known loosely as the Prepolymer Process. In this case the whole of the polyisocyanate is reacted with a part of the polyol to produce a liquid prepolymer, more accurately described as a semiprepolymer. This semiprepolymer is then reacted with the rest of the polyol in the presence of the auxiliary materials to form the finished foam.

Prepolymer Process

In this case the whole of the isocyanate is reacted with the whole of the polyol. The quantities are adjusted so that the product is a liquid material containing an excess of isocyanate groups. The prepolymer is polymerized by mixing with water, which reacts with and links the free isocyanate groups. The water provides some blowing action, but this can be supplemented if desired by a blowing agent.

For examples of rigid foams based upon hexitol polyethers which are convenient for use in the present invention reference may be made to British Pat. Spec. No. 876,469. Rigid foams based upon sucrose polyethers can also be employed.

The lead should be distributed throughout the foam and this may be achieved by premixing the lead with one or more of the polyurethane foam reactants before reaction takes place. For example, in the production of rigid polyurethane foam according to the invention by the "one-shot" process a proportion of the filler e.g., half by weight, may be added to the polyol and the remainder added to the isocyanate and these two modified reactants allowed to react in the presence of any one or all of the ingredients used in the production of polyurethane foams, e.g., water, blowing agents, catalyst systems, accelerators and antioxidants.

The lead-filled plastics foams of the present invention have a good physical strength, and possess excellent sound insulating qualities. The foams are of considerable use as the middle portion in the manufacture of sandwich building panels in which, for example; the outer skins are building board or sheet metal.

The invention will now be illustrated by reference to the following examples in which examples 1–3 are by way of comparison and examples 4 to 6 are according to the invention.

Examples 1–6

600 grams of a first polyurethane foam component containing a diisocyanate was mixed with 600 grams of powdered elemental lead (not less than 80 percent passing a British Standard Sieve Size 200) and 600 grams of a second polyurethane foam component consisting essentially of a polyol of the type described in British Pat. Spec. No. 876,469, was mixed with a further 600 grams of the powdered lead. The two components were then mixed together for about 10–15 seconds and then poured into moulds where foaming took place. A lead filled rigid polyurethane foam resulted.

A number of similar rigid foams were produced with differing lead concentrations.

From each foam produced a pair of samples 1 inch square by 24 inches long were cut and were vibrated transversely. The Young's Modulus was calculated from the natural frequency of vibration. In this regard, see, for example, "Noise Reduction," L. L. Beranec, McGraw Hill Publishing Co., 1960. The results are given in the table below:

TABLE

| Example | Lead filled foam (Wt. ratio lead:foam) | Young's modulus (lb./inch$^2$) | Weight % of lead based on total weight of lead and foam |
|---|---|---|---|
| 1 | 1:1 | 14,600; 14,600 | 50 |
| 2 | 3:1 | 16,800; 15,600 | 75 |
| 3 | 6:1 | 24,000; 17,000 | 85.7 |
| 4 | 7:1 | 55,000 | 87.5 |
| 5 | 9:1 | 132,000; 119,000 | 90 |
| 6 | 10:1 | 124,000; 103,000 | 90.9 |

It will be seen that examples 1–3 are not part of the invention as they do not exhibit Young's Modulus values of greater than 30,000 pounds per square inch and that example 4, 5 and 6 are according to the invention. Acoustic tests were carried out on a steel faced building panel filled with a polyurethane rigid foam according to the present invention having a lead:foam ration of 7:1. The steel sheets had a thickness of 0.040 inch and the core foam thickness of 0.250 inch. The panel had a density of 5.3 pounds per square foot and a sound insulation value of 35 decibels.

I claim:

1. A rigid polyurethane foam containing more than about 80 percent by weight of powdered elemental lead based on the total weight of the lead and the polyurethane foam, and having a Young's Modulus greater than 30,000 pounds per square inch, the powdered lead being of a size passing through a British Standard Sieve Size 100.

2. A rigid polyurethane foam as claimed in claim 1, having a Young's Modulus in the range 50,000 to 140,000 pounds per square inch.

3. A rigid polyurethane foam as claimed in claim 1, wherein the concentration of lead is in the range of about 85 to about 95 percent by weight, based on the total weight of the lead and the polyurethane foam.

4. A rigid polyurethane foam as claimed in claim 1, wherein the concentration of lead is in the range of about 87 to about 92.5 percent based on the total weight of the lead and the polyurethane foam.

5. A rigid polyurethane foam as claimed in claim 1, wherein at least 50 percent of the powdered lead passes through a British Standard Sieve Size 200.

* * * * *